(12) United States Patent
Polese

(10) Patent No.: US 6,216,845 B1
(45) Date of Patent: *Apr. 17, 2001

(54) AUTOMATIC LOADER OF FERRULES FOR BRUSHES

(75) Inventor: Giovanni Pietro Polese, Sarone di Caneva (IT)

(73) Assignee: Polese Giovanni Automation Srl (IT)

( * ) Notice: This patent issued on a continued prosecution application filed under 37 CFR 1.53(d), and is subject to the twenty year patent term provisions of 35 U.S.C. 154(a)(2).

Subject to any disclaimer, the term of this patent is extended or adjusted under 35 U.S.C. 154(b) by 0 days.

(21) Appl. No.: 08/964,063

(22) Filed: Nov. 4, 1997

(30) Foreign Application Priority Data

Nov. 5, 1996 (IT) ............ UD96A00213

(51) Int. Cl.⁷ .................................. B65G 47/24
(52) U.S. Cl. ........................... 198/398; 198/392
(58) Field of Search ................... 198/391, 392, 198/396, 398

(56) References Cited

U.S. PATENT DOCUMENTS

| | | | |
|---|---|---|---|
| 3,183,703 | * 5/1965 | Fischer | 198/391 |
| 3,204,751 | * 9/1965 | Durr | 198/398 |
| 3,707,217 | * 12/1972 | Sharbon | 198/391 |
| 4,253,213 | 3/1981 | Marino | 15/192 |
| 4,735,343 | * 4/1988 | Herzog | 198/398 |
| 4,804,093 | * 2/1989 | Durow | 198/391 |
| 4,818,784 | * 4/1989 | Sticht | 198/396 |
| 4,938,082 | * 7/1990 | Buckley et al. | 198/392 |

FOREIGN PATENT DOCUMENTS 3242044  5/1984 (DE).
1150323  4/1969 (GB).

OTHER PUBLICATIONS

Patent Abstracts of Japan, vol. 017, No. 563 (P–1628), Oct. 12, 1993 05164528.
Patent Abstracts of Japan, vol. 007, No. 257 (M–256), Nov. 16, 1983 58139912.

* cited by examiner

Primary Examiner—Joseph E. Valenza
Assistant Examiner—Joe Dillon, Jr.
(74) Attorney, Agent, or Firm—Adams & Wilks

(57) ABSTRACT

An automatic loader has a vibrational feeding assembly for vibrationally feeding ferrules to a loader of a ferrule assembling machine. The vibrational feeding assembly has a frame for containing the ferrules and a guide channel having a transport surface along which the ferrules are vibrationally transported from the frame to the loader of the ferrule assembling machine. A detecting device detects an orientation of each ferrule while the ferrule is vibrationally transported along the transport surface of the guide channel. An expulsion device expels the ferrule back to the frame of the vibrational feeding assembly when the orientation of the ferrule detected by the detecting device does not correspond to a preselected orientation of the ferrule.

19 Claims, 3 Drawing Sheets

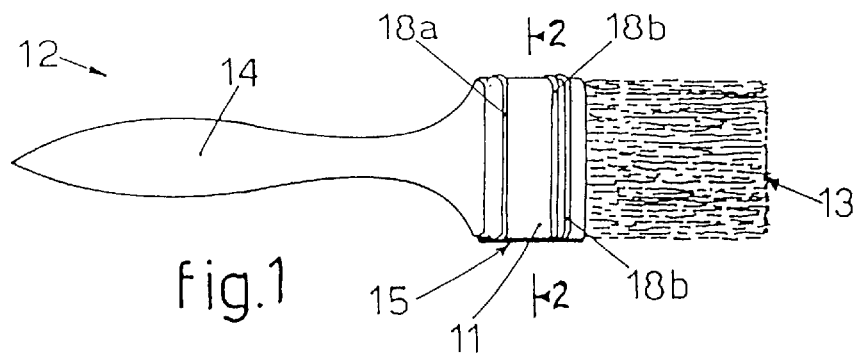
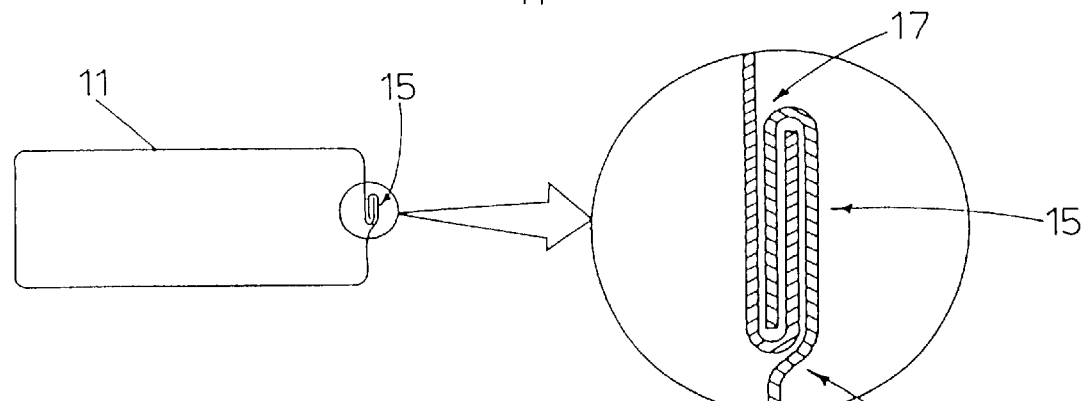
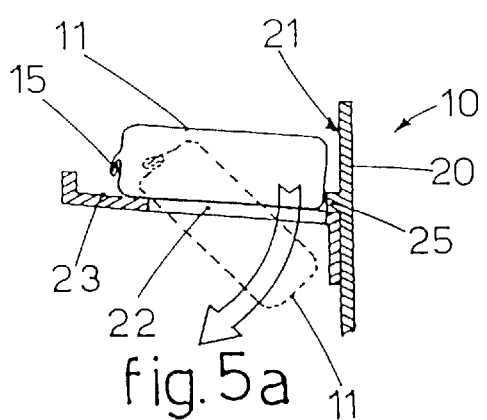
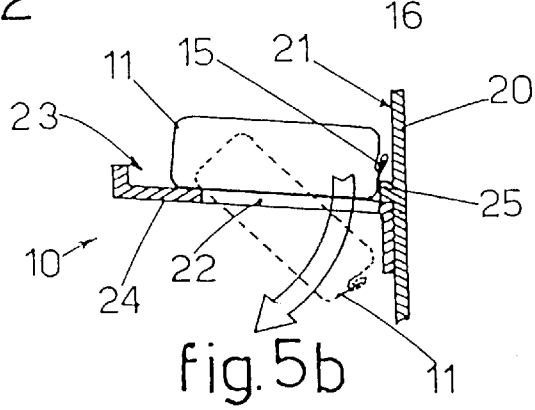
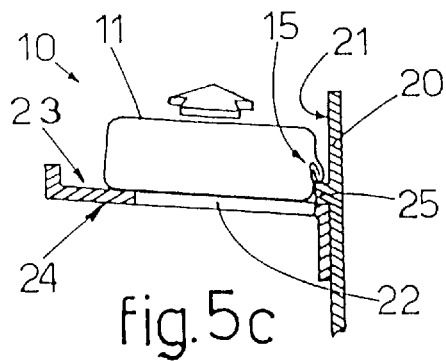
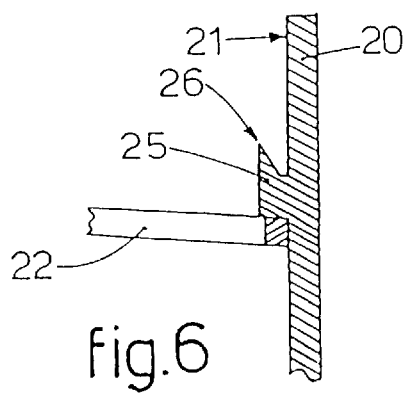

AUTOMATIC LOADER OF FERRULES FOR BRUSHES

BACKGROUND OF THE INVENTION

1. Filed of the Invention

This invention concerns an automatic loader of ferrules for brushes as set forth in the main claim.

The invention is applied in the production of brushes, particularly to feed the ferrules in a desired and correct manner to the ferrule-assembling machine located downstream of the loader, wherein the bundle of bristles, and possibly also the handle, is associated with the ferrules.

The invention is applied to brushes of the flat type where the ferrule consists of a band of metal strip closed in a ring of whatsoever shape, either rectangular, round, polygonal, etc.

2. Background Information

Ferrule-assembling machines are known in the brush industry, which are fed separately by bundles of bristles, which constitute the terminal end of the brush, and by ferrules on which the bundles of bristles are attached, normally by means of glueing.

The ferrules are made by closing a band of metallic strip in a ring-shape, then super-imposing and crushing the edges along one of the narrow sides so as to constitute an outer closing projection.

The ferrules generally bear perimeter ribs and writings to identify the brush such as size, brand name, type of bristle or other information in order to define a univocal position wherein the bundle of bristles and the handle are assembled.

The function of the ribs is to stiffen the ferrule but they also function as an element to anchor the adhesive substance, for example the rubber cement, which is used to attach the bundle of bristles to the ferrule.

It is the presence of these ribs which determines univocally the side of the ferrule where the bundle of bristles will be inserted and the side of the ferrule, opposite the first, where the handle of the brush will be inserted.

At present, the operation of feeding the ferrules into the loader of the ferrule-assembling machine is performed manually by a worker who positions them one by one in the only correct feeding position inside the loader.

This manual operation takes a long time and involves a considerable increase in the costs of the operation of assembling the brushes.

To be more exact, the fact that the worker must be present conditions the productivity of the ferrule-assembling machine which, for this reason, is slowed down; this signifies that the full potential of the machine is not exploited and therefore businessmen working in this field have been complaining of this problem for some time.

To overcome this problem and to automate the step of feeding and loading the ferrules to the ferrule-assembling machine there has been a proposal to combine, upstream of the ferrule-assembling machine, a vibrator-feeder device to feed the ferrules automatically, separating them one by one and sending them towards the feeder zone of the ferrule-assembling machine.

This feeder device has the disadvantage that it cannot make a distinction between the side of the ferrule which will cooperate with the bundle of bristles and the side of the ferrule wherein the handle of the brush will be inserted.

In order to overcome this problem, the feeder device can be used only with particular ferrules of a symmetrical type, which increases costs due to the production of the particular ferrules and moreover it means that non-specialised ferrules obviously cannot be used.

The present applicant has designed, tested and embodied this invention to overcome the shortcomings of the state of the art, and to provide further advantages.

The invention is set forth and characterised in the main claim, while the dependent claims describe variants of the idea of the main embodiment.

SUMMARY OF THE INVENTION

The purpose of the invention is to provide an automatic loader of ferrules for brushes which will ensure the correct positioning and directioning of the ferrules fed to the ferrule-assembling machine, thus allowing only correctly directioned ferrules to be fed.

The invention makes it possible to use both ferrules made of plastic material and also ordinary metallic ferrules, made from a strip of metal, either brass, stainless steel or otherwise, closed in a ring and having the outer closing projection on one of the narrow sides.

The invention makes it possible to considerably increase the productivity of the ferrule-assembling machine and does not need the constant presence of a worker, with a consequent reduction in the overall costs of the operation to produce the brushes.

The loader according to the invention is simple, economical, small in size and does not use any energy in its working.

The invention is applied in cooperation with the usual feeder assemblies, whether they be vibratory or not, by means of simple, rapid and inexpensive modifications.

The automatic loader according to the invention includes a guide channel, associated with the feeder assembly, for example of the vibratory type, on which the ferrules advance, separated one by one, with the wide face resting on the transport plane of the guide channel and with the open sides arranged in the direction of feed.

The guide channel comprises at least a substantially vertical side wall which cooperates with the transport plane.

The loader according to the invention comprises, upstream of the inlet to the feeder of the ferrule-assembling machine, means to monitor the directioning of the ferrules, functionally associated with expulsion means for expelling the ferrules which are not correctly directioned.

To be more exact, the expulsion means are governed by the monitoring-means and allow only the correctly directioned ferrules to pass towards the ferrule-assembling machine, while they send incorrectly directioned ferrules back inside the vibrator-feeder assembly.

According to a first embodiment of the invention, the monitoring and expulsion means consist respectively of a control aperture or window, made on a wall of the guide channel and by a protruding restraining element made on another wall of the same guide channel.

The control window is longer than the ferrule, the length of the ferrule being measured as the distance between the two open sides thereof, and is slightly less wide than the ferrule.

In this embodiment, at least in correspondence with the monitoring means and the expulsion means, the bottom wall of the guide channel slopes towards the side wall where there is the protruding restraining element; this ensures that one of the two narrow sides of the advancing ferrules continuously rests against the side wall of the guide channel where there is the protruding restraining element and therefore ensures that the protruding restraining element cooperates in contact with one of the two narrow sides of the ferrule.

When the ferrule is correctly positioned, that is to say, with the outer projection resting on the side wall of the guide channel where there is the protruding restraining element and with the fold of the outer projection facing downwards, the restraining element comes into contact with the fold, and holds the ferrule on the transport plane of the guide channel for the whole time needed to pass by the control window.

In all other cases when the ferrule is not correctly directioned on the guide channel, the vibrations cause the ferrule, which is not held laterally by the restraining element, to fall through the control window into the vibrator-feeder assembly again.

With this configuration, only those ferrules which are correctly positioned and directioned pass by the control window and are fed in the desired and correct position to the loader of the ferrule-assembling machine located downstream.

According to a variant of the invention, the aforesaid monitoring means consist of optical monitoring means such as video cameras, sensors, photoelectric cells, fibre optics, etc., and the expulsion means consist of thruster elements with an electromagnetic, pneumatic or hydraulic drive.

In one embodiment, the optical monitoring means consist of a video camera cooperating with the guide channel of the loader.

The images supplied by the video camera are processed, for example compared with a sample image of a correctly directioned ferrule, and the result of this processing determines whether or not the expulsion means are activated to take the incorrectly directioned ferrule back to the vibrator-feeder assembly.

BRIEF DESCRIPTION OF THE DRAWINGS

The attached Figures are given as an non-restricted example and show a preferential embodiment of the invention as follows:

FIG. 1 shows in diagram form an assembled brush complete with handle, bundle of bristles and clamping ferrule;

FIG. 2 shows a cross-sectional view of the ferrule taken along line 2—2 shown in FIG. 1;

FIG. 3b shows in diagram form a view from above of the automatic loader as shown in FIG. 3a;

FIG. 4 shows in diagram form, on an enlarged scale, a view from above of a detail of the automatic loader as shown in FIG. 3a;

FIGS. 5a, 5b and 5c are partial cross-sectional views taken along line 5—5 in FIG. 4 showing three ferrules in different positions cooperating with the monitoring and expulsion means of the loader according to the invention;

FIG. 6 shows on an enlarged scale a variant of FIGS. 5a, 5b and 5c.

DETAILED DESCRIPTION OF THE PREFERRED EMBODIMENTS

Figure 3B:
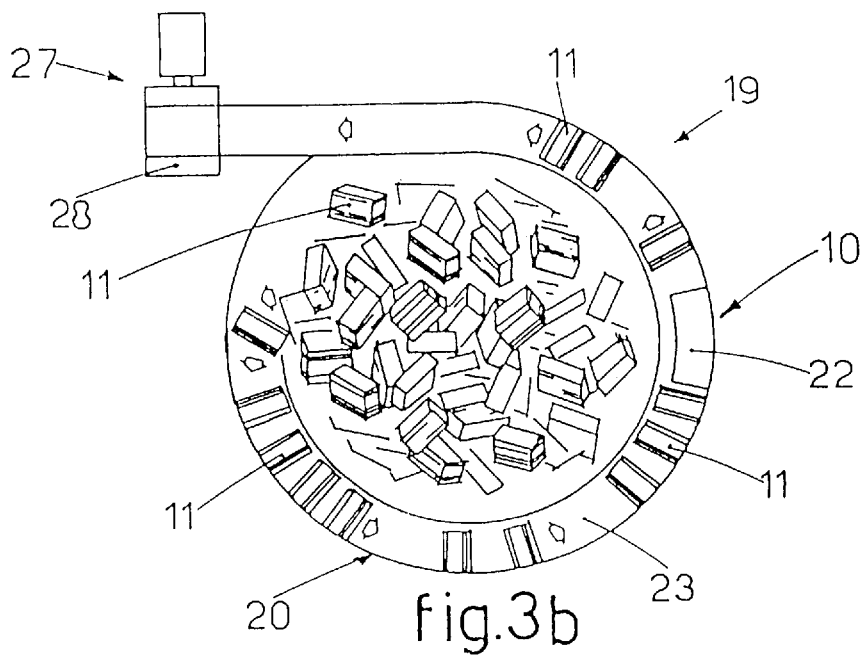
Figure 3A:
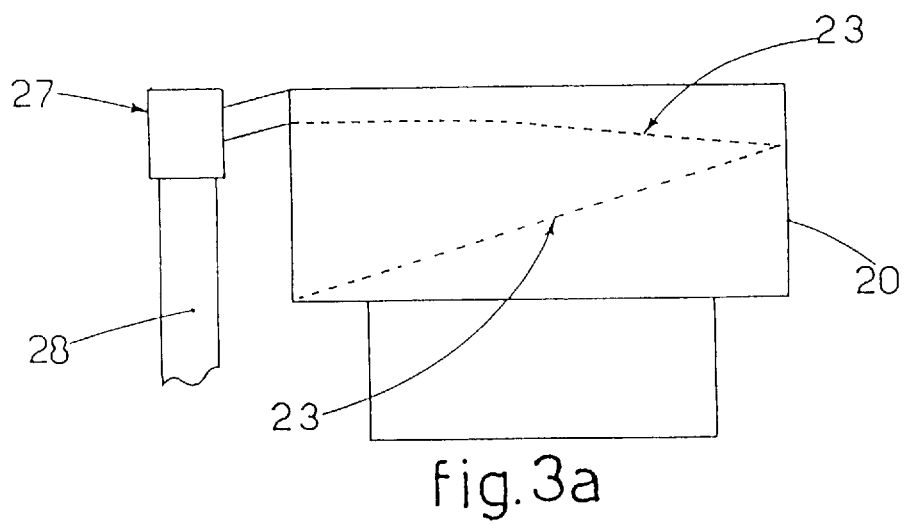
FIG. 3a shows in diagram form a side view of an automatic loader according to the invention.
Figure 4:
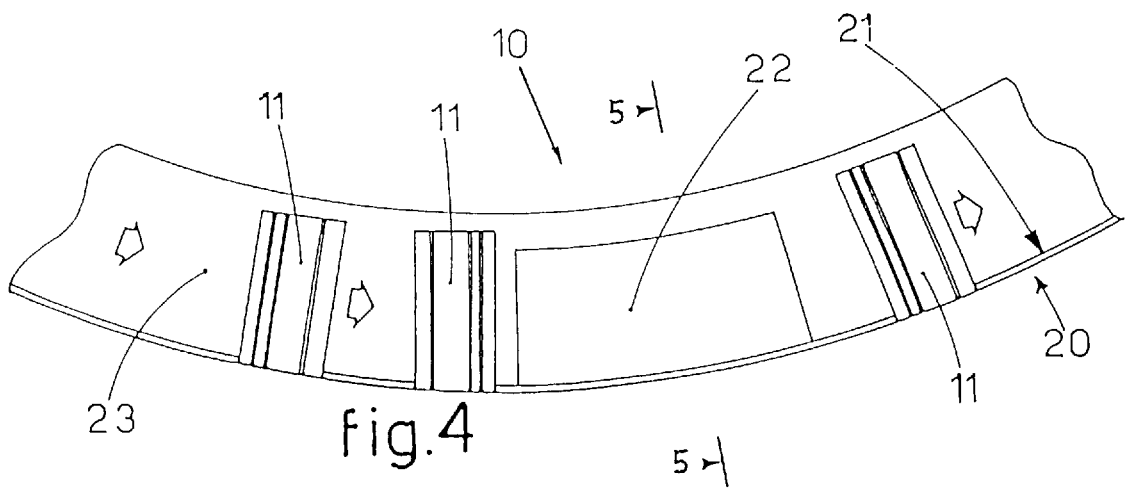

In the Figures, the reference number 10 denotes generally an automatic loader of ferrules 11 which is applied in the production of brushes 12 of the flat type comprising a ferrule 11 to which on one side a bundle of bristles 13 and on the other side a handle 14 are solidly associated.

The ferrule 11 is of the type which is obtained by closing a band of metallic strip in a ring shape, then super-imposing and crushing the edges along one of the narrow sides so as to constitute an outer closing projection 15.

As shown in FIG. 2 the outer closing projection 15, in this case, includes a rounded side 16 and a protruding fold 17.

In this case, the ferrule 11 includes a circumferential 33 rib 18a associated with the edge cooperating with the handle 14 and two circumferential ribs 18b associated with the edge cooperating with the bundle of bristles 13.

Figure 7:
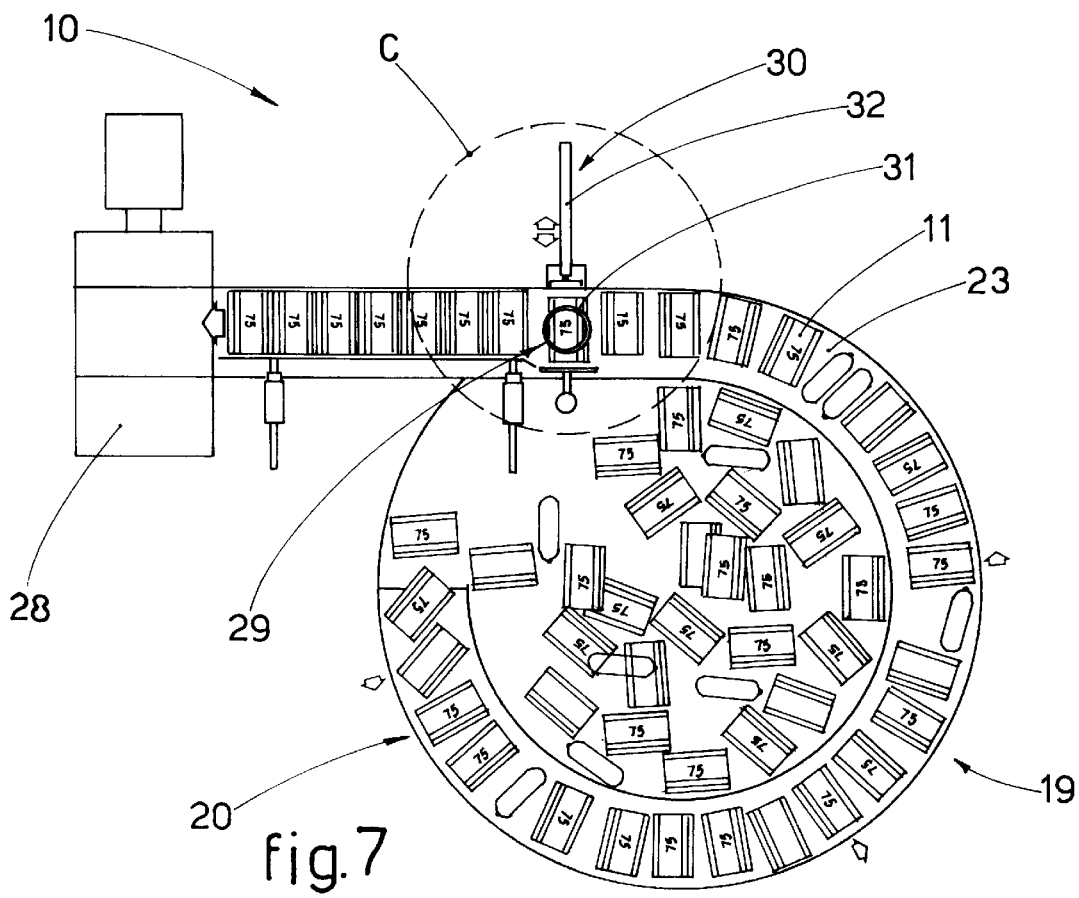
FIG. 7 shows a variant of FIG. 3b.

The ferrules 11 shown in the embodiment of FIG. 7, moreover, include identification markings, in this case a number indicating the size of the brush 12 which, in cooperation with the ribs 18a and 18b define a univocal position wherein the bundle of bristles 13 and the handle 14 are assemble with respect to the ferrule 11.

The automatic loader 10 according to the invention comprises a vibrator-feeder assembly 19 equipped with a substantially cylindrical frame 20 having a side wall 21 and a guide channel 23 on which the ferrules 11 travel in a line and one by one.

The ferrules 11 are loaded pell-mell into the frame 20 where they are then separated by the vibration and are aligned on the transport plane of the guide channel 23.

In this case, the outer terminal segment of the guide channel 23 is associated with insertion means 27 to insert the ferrule 11 into the loader 28 of the ferrule-assembling machine located downstream and not shown here.

The loader 10 according to the invention includes, upstream of the ferrule-assembling machine, means 29 for detecting or monitoring the orientation or directioning of the ferrules 11 which are functionally associated with expelling means 30 for expelling the ferrules 11 not correctly directioned.

To be more exact, the cooperation between the monitoring means 29 and the expulsion means 30 is such that only the correctly directioned ferrules 11 are sent to the ferrule-assembling machine whereas the incorrectly directioned ferrules 11 are sent back to the frame 20.

In the embodiment shown in FIGS. 3a–6, the guide channel 23, at least in correspondence with the monitoring means 29 and expulsion means 30, has the bottom wall 24 which defines the transport plane sloping downwards in the direction of the side wall 21 of the frame 20, so as to ensure a constant and continuous contact of the ferrule 11 with the side wall 21.

In this embodiment, the expulsion means 30 of the automatic loader 10 comprises of a control and discharge opening or window 22, made on the bottom wall 24 of the guide channel 23, which is longer than the ferrule 11 as measured between the two open faces wherein respectively the handle 14 and the bundle of bristles 13 are inserted, and is coordinated in width to the width of the ferrule 11.

The monitoring means 29 monitoring for monitoring the directioning of the ferrules 11 comprises of a restraining element 25, associated with the side wall 21 of the guide channel 23, which has the function of cooperating with the protruding fold 17 of the outer closing projection 15 of the ferrule 11 in order to hold only the correctly positioned ferrules 11.

In the variant shown in FIG. 6, the restraining element 25 has its upper edge 26 shaped like a wedge so as to facilitate a better grip on the protruding fold 17 of the outer closing projection 15 of the ferrule 11.

In the embodiments shown, the restraining element 25 is an integral part of the side wall 21.

According to a variant which is not shown here, the restraining element 25 consists of an autonomous element, such as for example a metallic blade, whose lower part is associated solidly with the side wall 21 of the guide channel 23 in correspondence with the control and discharge window 22.

As shown in FIGS. 5a and 5b, when the ferrules 11 as they advance are not correctly positioned on the guide channel 23 in correspondence with the control and discharge window 22, the ferrule 11 which is not restrained by the restraining element 25 slips and falls through the control and discharge window 22 inside the frame 20.

To be more exact, this is due to the downward inclination of the bottom wall 24 in the direction of the side wall 21 and to the fact that the restraining element 25 cooperates either with a smooth section of the edge of the ferrule 11 (FIG. 5a) or with the rounded section 16 of the projection 15 (FIG. 5b).

Figure 8:
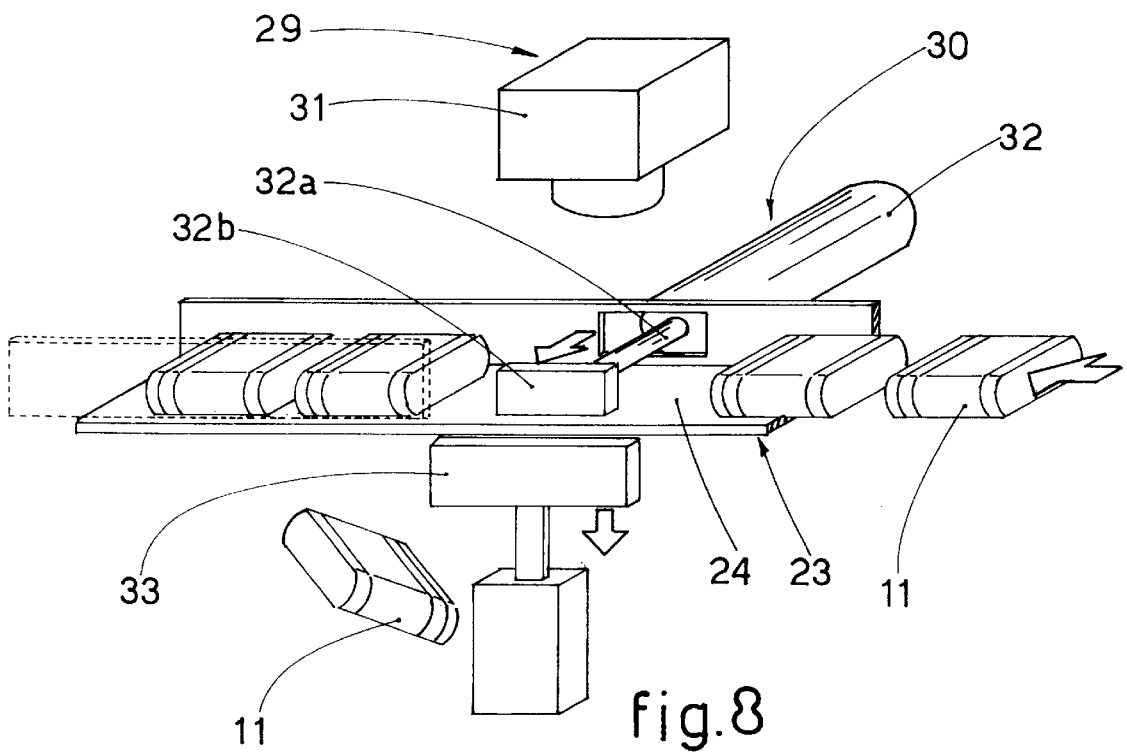
FIG. 8 shows a three-dimensional and enlarged view of the detail is shown in FIG. 7.

It is only if the ferrule 11 is in a correct position that the restraining element 25 cooperates with the protruding fold 17 of the projection 15, and thus restrains the ferrule 11 in the guide channel 23 so that it can pass over the control and discharge window 22 and can continue towards the ferrule-assembling machine In the variant shown in FIGS. 7–8, the monitoring means 29 and the expulsion-means 30 comprise respectively visual detecting means, such as a video recording camera 31 disposed above the guide channel 23 and an actuator device 32, of the electromagnetic, hydraulic or pneumatic type underneath the video camera 31.

The images taken by the video camera 31 are compared by a processor with a sample image and the actuator 32 is activated by the processor every time the images taken by the video camera 31 differ from the sample image. Thus the processor constitutes a means for controlling the actuator device 32 to activate the same when the images taken by the video camera 31 differ from the sample image.

In this case, both the ribs 18a, 18b and also the identification markings between the ribs 18a, 18b are used as elements to compare the image captured by the video camera 31 and the sample image.

In the embodiment shown here, the actuator 32 includes a piston 32a with which a thruster element 32b is associated.

In cooperation with the thruster element 32b, and in front thereof, on the opposite side with respect to the guide channel 23, there is a contrasting element 33 which, from a raised position maintained as the correctly directioned ferrules 11 pass so that they do not fall accidentally into the frame 20, is taken to a lowered position, as shown in FIG. 8, which allows incorrectly directioned ferrules 11 to be expelled from the guide channel 23.

According to a variant which is not shown here, the expulsion means 30 comprises an opening on the bottom wall 24 of the guide channel 23, equipped with a window which is servocontrolled by the video camera 31 itself; when the window is opened, the incorrectly directioned ferrules 11 fall into the frame 20.

What is claimed is:

1. An automatic loader comprising: a vibrational feeding assembly for vibrationally feeding ferrules to a loader of a ferrule assembling machine, the vibrational feeding assembly having a frame for containing the ferrules and a guide channel having a transport surface along which the ferrules are vibrationally transported from the frame to the loader of the ferrule assembling machine; detecting means for detecting an orientation of each ferrule while the ferrule is, vibrationally transported along the transport surface of the guide channel; and expulsion means for expelling the ferrule back to the frame of the vibrational feeding assembly when the orientation of the ferrule detected by the detecting means does not correspond to a preselected orientation of the ferrule.

2. An automatic loader according to claim 1; wherein the expulsion means comprises a discharge opening extending through the transport surface of the guide channel and through which the ferrule is discharged into the frame of the vibrational feeding assembly when the orientation of the ferrule detected by the detecting means does not correspond to the preselected orientation.

3. An automatic loader according to claim 2; wherein the discharge opening has a length greater than that of the ferrule.

4. An automatic loader according to claim 2; wherein the detecting means includes restraining means for preventing the discharge of the ferrule through the discharge opening when the orientation of the ferrule detected by the detecting means corresponds to the preselected orientation.

5. An automatic loader according to claim 4; wherein the frame of the vibrational feeding assembly has a side wall connected to the guide channel; and wherein the restraining means comprises a restraining element disposed on the side wall of the frame for engagement with a projection of the ferrule when the orientation of the ferrule transported along the transport surface of the guide channel corresponds to the preselected orientation.

6. An automatic loader according to claim 5; wherein the restraining element comprises a separate element integrally connected to the side wall of the frame.

7. An automatic loader according to claim 5; wherein the restraining element and the side wall of the frame are formed unitarily from a single piece of material.

8. An automatic loader according to claim 5; wherein a portion of the transport surface of the guide channel confronts the restraining element and is sloped downward toward the side wall of the frame.

9. An automatic loader according to claim 8; wherein the restraining element comprises a separate element integrally connected to the side wall of the frame.

10. An automatic loader according to claim 8; wherein the restraining element and the side wall of the frame are formed unitarily from a single piece of material.

11. An automatic loader according to claim 8; wherein the restraining element has an upper edge having a generally wedge shape and a lower edge connected to the side wall of the frame.

12. An automatic loader according to claim 11; wherein the restraining element and the side wall of the frame are formed unitarily from a single piece of material.

13. An automatic loader according to claim 11; wherein the restraining element comprises a separate element integrally connected to the side wall of the frame.

14. An automatic loader comprising: a vibrational feeding assembly for vibrationally feeding ferrules to a loader of a ferrule assembling machine, the vibrational feeding assembly having a frame for containing the ferrules and a guide channel having a transport surface along which the ferrules are vibrationally transported from the frame to the loader of the ferrule assembling machine; a restraining element connected to the frame for detecting an orientation of each ferrule transported along the transport surface of the guide channel; and a discharge opening extending through the transport surface of the guide channel and through which the ferrule is discharged into the frame of the vibrational feeding assembly when the orientation of the ferrule detected by the restraining element does not correspond to a preselected orientation of the ferrule.

15. An automatic loader according to claim 14; wherein the frame of the vibrational feeding assembly has a side wall connected to the guide channel; and wherein the restraining element is disposed on the side wall of the frame for engagement with a projection of the ferrule when the orientation of the ferrule transported along the transport surface of the guide channel corresponds to the preselected orientation.

16. An automatic loader according to claim 15; wherein a portion of the transport surface of the guide channel confronts the restraining element and is sloped downward toward the side wall of the frame.

17. An automatic loader according to claim 15; wherein the restraining element has an upper edge having a generally wedge shape and a lower edge connected to the side wall of the frame.

18. An automatic loader according to claim 15; wherein the restraining element and the side wall of the frame are formed unitarily from a single piece of material.

19. An automatic loader according to claim 15; wherein the restraining element comprises a separate element integrally connected to the side wall of the frame.

* * * * *